Sept. 13, 1932.    C. H. DESAUTELS    1,876,633
TIRE BUILDING APPARATUS
Filed March 30, 1928    2 Sheets-Sheet 1

INVENTOR.
CHARLES H. DESAUTELS.
BY
Robert M. Haney
ATTORNEY.

Sept. 13, 1932.  C. H. DESAUTELS  1,876,633
TIRE BUILDING APPARATUS
Filed March 30, 1928   2 Sheets-Sheet 2
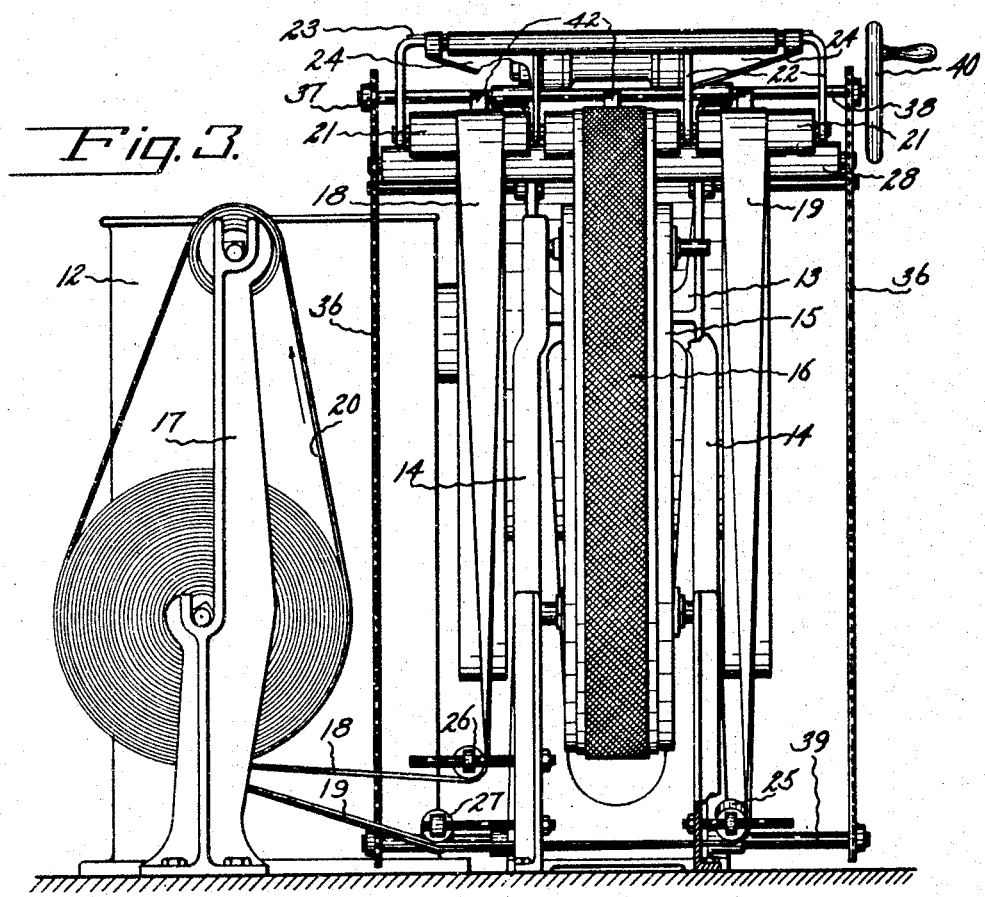
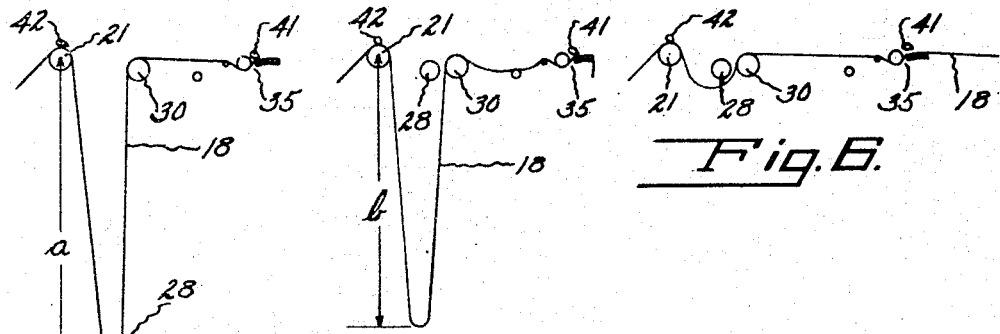
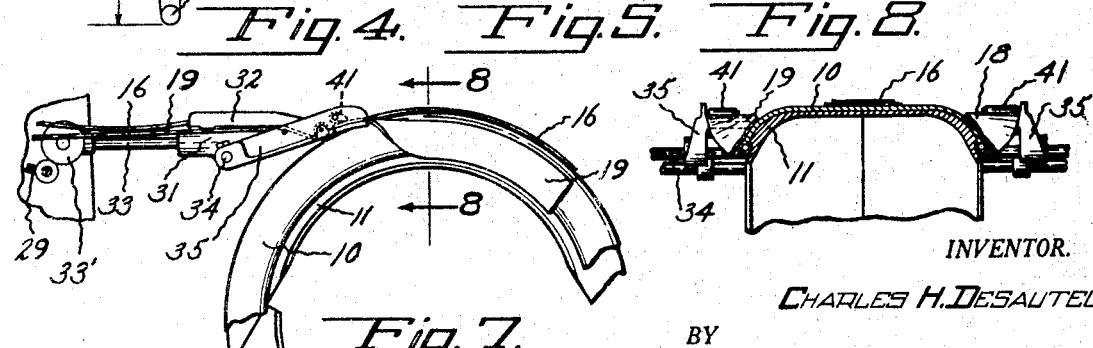
INVENTOR.
CHARLES H. DESAUTELS.
BY
ATTORNEY.

Patented Sept. 13, 1932

1,876,633

UNITED STATES PATENT OFFICE

CHARLES H. DESAUTELS, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS

TIRE BUILDING APPARATUS

Application filed March 30, 1928. Serial No. 265,836.

My invention relates to a tire building apparatus used in the construction of pneumatic tire casings, and more particularly it relates to the arrangement for holding and guiding strip material onto the tire building drum.

In the construction of pneumatic tires, strips of rubber and rubberized material are used which must, to achieve the best results, be guided smoothly, evenly, and without tension onto the tire. This strip material is usually carried in liners and as the material is drawn from the liners it tends to stick to the latter and stretches in varying degrees, depending on the adherence between the stock and the liner, and if placed directly onto the carcass, as is now customary, the stock in the finished casing would vary from the correct weight, width, and thickness.

One object of my invention is to provide a method of handling strips of rubber or rubberized material prior to its incorporation in a tire carcass such that, irrespective of variations in the degree of tackiness of the material and consequent variation in the amount of stretch imparted to the strip as it is pulled from the liner, the strip when built into the tire will be uniform. A further object is to provide means for carrying out my method which may be associated with any conventional type of building machine. Other and further objects will be apparent from the following specification and claims.

Referring to the drawings:

Fig. 3 is a view looking in at the left of Fig. 1;

Figs. 4, 5, and 6 are diagrammatic views showing a pre-stretching of the breaker and chafing strip material;

Fig. 7 is a fragmental view showing material being guided onto a tire carcass; and Fig. 8 is a view taken on line 88 of Fig. 7.

Figure 1:
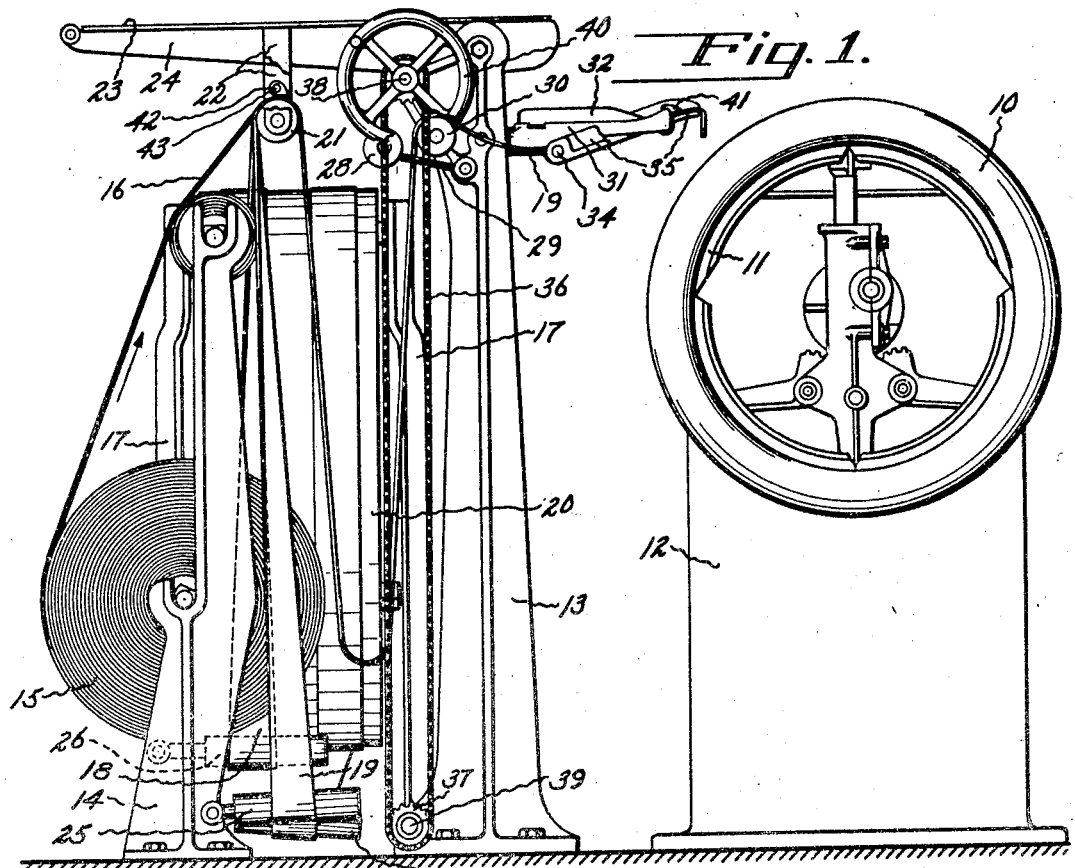
Fig. 1 shows a side elevation of the apparatus in relation to a tire building drum.

In the drawings, a tire carcass 10 has been built on the building drum 11 of a tire building machine 12. A standard 13 of the tire building apparatus is located behind the building drum 11 as best shown in Fig. 1. At some distance behind the standard 13 are a pair of supports 14 carrying, in a liner roll 15, plied breaker and padding material 16. Another pair of supports 17 is used for carrying chafing strip material 18 and 19 rolled in a liner 20. These latter supports are placed at right angles to the breaker strip supports 14 for the conservation of space and for ease in supplying the liners to the supports.

The three strips of material, the two chafing strips 18 and 19 and the plied breaker and padding strip 16, are brought over supporting rolls 21 carried in brackets 22. These brackets are fixed to a plate 23 which is supported on a pair of arms 24 fixed in the support 13. Before riding over the rolls 21 the chafing strips 18 and 19 are first carried around adjustable centralizing rolls 25, 26 and 27 and then make a quarter turn before going over the rolls 21. After passing over the rolls 21 the material passes under a vertically actuated roll 28, between adjustable guiding pins 29 and over another set of supporting rolls 30.

Figure 2:
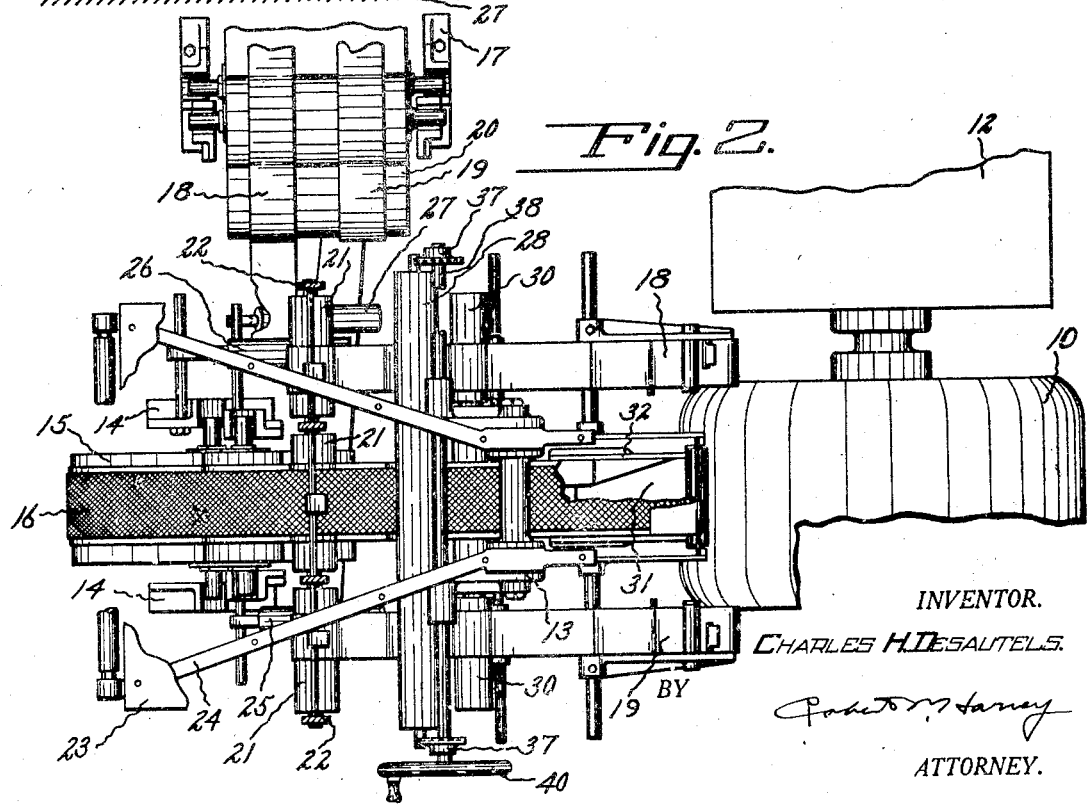
Fig. 2 is a plan view of Fig. 1 with certain parts omitted.

The breaker strip 16 is drawn from its supporting roll 30 over a guide 31 having a pair of adjustable flanges 32 adapted to confine the edges of the strip. The guide is slidably held on a pair of rods 33 (see Fig. 7) fixed to a spacer 33' in the standard 13. Adjustably mounted on a rod 34 fixed to the guide 31 are a pair of chafing strip guides 35. The guides 31 and 35 may be moved as a unit from inoperative position as shown in Figs. 1 and 2 to operative position shown in Fig. 7, this latter position bringing the guides as close as possible to the tire carcass under construction.

The vertically actuated roll 28 will, upon its downward movement, draw the stock off the liners as well as cause the stock to stretch as explained above. This stretcher roll 28 is fixed between two lengths of chain 36 riding over sprockets 37 mounted on shafts 38 and 39 in the standard 13 and actuated, as shown, by a handwheel 40, although it may be actuated by power if desired.

Reference to the diagrammatic views 4, 5, and 6 will illustrate the operation of the roll 28. When the tire builder has finished placing the breaker and chafing strips on a carcass, he operates the handwheel 40 so that the roll 28 will move from its rest position, as shown in Fig. 1, down toward the floor carrying a loop of stock with it. Pawls 41 on the guides 31 and 35 will prevent the end of the strips from moving, thus causing the material to be drawn from the liners. The loop of stock is carried down a distance designated in Fig. 4 as "a" and the roll 28 is returned to its raised position. Pawls 42, similar to the pawls 41 and set on a rod 43 just above the rolls 21 will hold the stock in this position. By the time the tire builder is again ready to use the breaker and chafing strip material, it will have contracted, if stretched as it was drawn off, to its original length and condition. The length of loop of the contracted material is designated in Fig. 5 as "b". Fig. 6 shows the relation of the breaker and chafing strip material to the supporting rolls after it has been fed about the casing under construction and just before it is cut.

Having thus described my invention, I claim:

1. A device of the character described comprising a pair of stock supporting rolls, a vertically actuated roll intermediate the said rolls adapted to form a loop in the stock, pawls on one of the stock carrying rolls adapted to allow the stock to be drawn into a loop but not allowing the stock to back from looped position, guides adapted to lead the strips of stock onto a tire building drum, and pawls on the said guides adapted to hold the strips of stock on the guides when the stock is not being drawn onto the drum.

2. A device of the character described comprising a standard, a pair of supports adjacent the standard adapted to carry rolls of stock, a plurality of adjustable centralizing rolls adapted to have strips of stock drawn over them, a pair of spaced supporting rolls in the path of the strips, a vertically actuated roll intermediate the pair of supporting rolls adapted to loop the stock between said supporting rolls, a series of adjustable stock guiding pins, and adjustable guides adapted to lead the strips of fabric onto a tire building drum.

3. A device for supplying strips of material to a tire building machine which comprises a support for a roll of strip material, a guide for delivering the material to a tire building machine, a pawl associated with the guide and engaging the strip to prevent rearward movement of the strip, a pair of spaced supporting rolls positioned between the roll of material and the guide and over which the strip is adapted to pass, a third roll positioned intermediate the supporting rolls and above the strip, means to move said third roll downwardly to draw the material from the roll, and to return said third roll to original position leaving a freely suspended loop of material between the supporting rolls and a pawl associated with that supporting roll nearest the supply roll to prevent rearward movement of the strip of material.

4. A device for supplying strip material which comprises a pair of spaced supports over which the strip is passed, means to engage the material and means to move said material engaging means to draw the material under tension into a loop between the supports and to return the material engaging means to its initial position to free the looped material from tension.

5. A device for supplying strip material which comprises a pair of rolls over which the material is passed from a source of supply, means to engage the material intermediate said rolls and means to move said material engaging means to draw the material under tension into a loop and to return the material engaging means to initial position to leave the material in freely suspended loop form between the rolls.

CHARLES H. DESAUTELS.